F. A. BULLER.
GAMBREL.
APPLICATION FILED JULY 17, 1911.
1,022,298.
Patented Apr. 2, 1912.
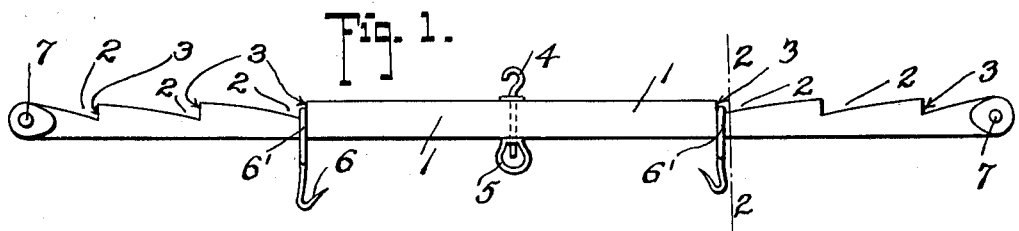
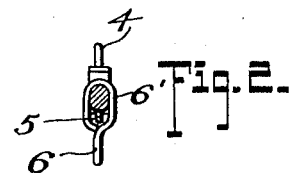
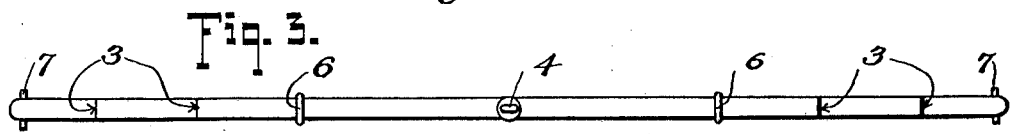
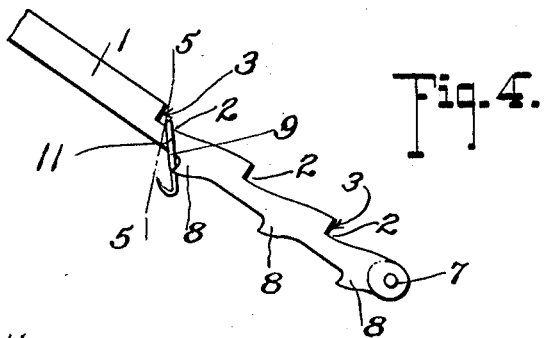
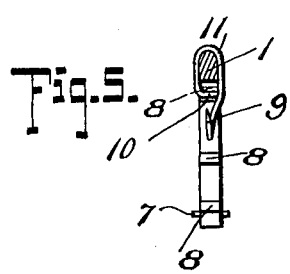
WITNESSES:
Charles H. Wagner,
E. Larson
INVENTOR
Fred A. Buller
BY
Attorneys
COLUMBIA PLANOGRAPH CO., WASHINGTON, D. C.

UNITED STATES PATENT OFFICE.

FRED A. BULLER, OF SPRINGFIELD, SOUTH DAKOTA.

GAMBREL.

1,022,298. Specification of Letters Patent. Patented Apr. 2, 1912.

Application filed July 17, 1911. Serial No. 638,987.

*To all whom it may concern:*

Be it known that I, FRED A. BULLER, a citizen of the United States, residing at Springfield, in the county of Bonhomme and State of South Dakota, have invented certain new and useful Improvements in Gambrels, of which the following is a specification.

This invention relates to gambrels.

An object is to provide an extremely simple and efficient device for supporting a carcass while cooling or while being treated in various ways by a butcher.

Another object is to provide a gambrel which will be inexpensive to construct, and which has special advantages for handling carcasses in the parting and scalding operations, and also for lifting a carcass from and into engagement with the gambrel.

A further object is to provide peculiar adjusting means on the device.

With the above and other objects in view, this invention consists in the construction, combination, and arrangement of parts, all as hereinafter more fully described, claimed and illustrated in the accompanying drawings, wherein—

Figure 1 is a side view; Fig. 2 is a section on the line 2—2 of Fig. 1; Fig. 3 is a top plan view; Fig. 4 is a fragmentary view of an end of the gambrel bar used in a modified form; and Fig. 5 is a section on line 5—5 of Fig. 4, illustrating the modified gambrel hook in place.

Throughout the following detail description and on the several figures of the drawings, similar parts are referred to by like reference characters.

Referring to the drawings, at 1 is indicated a gambrel bar constructed in accordance with the present invention, and which may be made of any suitable material, such as wood or iron. Adjacent to its opposite ends, the bar 1 has provided thereon a series of notches 2 which are formed with a shoulder 3 facing toward the adjacent end of the bar. On the same side with the notches 2, or upper side, at an intermediate point the bar 1 has secured thereto a supporting hook 4. Secured to the hook 4 under the bar 1 is an eye 5, the purpose of which will hereinafter appear. Located on the notched portions of the bar are gambrel hooks 6, each having a loop 6', which is sufficiently large to permit adjustment of the hook from one notch to another. At each end of the bar and piercing said bar transversely is a pin 7, the length of which is sufficient to prevent displacement of the gambrel hook 6.

In operation, the gambrel is suspended from a bar or other support by direct engagement of the hook 4, or by such means as a chain, which is caught by said hook. The hind legs of the slaughtered animal are caught by the gambrel hooks 6 in the usual manner, said hooks being easily adjusted by means of the notches 2 to properly spread the sides of the slaughtered animal as required in cleaning and dressing the carcass. It will be noted that the gambrel hooks in coöperation with the notches on the gambrel bar afford an extremely simple and convenient adjustment of the gambrel as required in spreading the sides of a carcass, or when it is desired to adjust the size of the gambrel to suit different sizes of carcasses, the shoulders 3 assuring positive adjustment.

Owing to the custom of cutting a carcass in two parts while it is still supported on the gambrel and removing one-half at a time, the remaining half of the carcass may become disengaged from the gambrel and drop on the floor, thereby causing much trouble in replacing and cleaning the same. In the present invention this difficulty is eliminated by the provision of the pins 7 at the ends of the gambrel bar.

The purpose of the eye 5 at the under side of the gambrel bar is to support a tackle therefrom which, under certain conditions, is used to advantage in lowering a slaughtered hog into the scalding bath. Said tackle is also used for lifting a carcass to and from support by the gambrel.

In the modified form illustrated in Fig. 4 the gambrel bar 1 has lugs 8 on the under side thereof, opposite to the notches 2, and the gambrel hook 9 illustrated in Fig. 5 has a locking projection 10 at the lower part of the loop 11. The locking projection 10 will normally clear the lugs 8 and not interfere with the adjustment of the gambrel hook from one notch to another. However, should the gambrel for any reason become tilted from the normal horizontal position as, for instance, by separating half of the carcass from the gambrel, then the locking projection 10 will contact with an adjacent lug 8 and thereby slipping of the hook will be prevented.

Having thus fully described my invention, what is claimed as new is:—

A gambrel comprising a gambrel bar having notches and lugs carried on opposite sides thereon, and a gambrel hook adjustably carried by said gambrel bar and coöperating with said notches and lugs to hold said gambrel hook in adjusted position.

In testimony whereof I affix my signature in presence of two witnesses.

FRED A. BULLER.

Witnesses:
J. O. SMITH,
J. C. UNRUH.

Copies of this patent may be obtained for five cents each, by addressing the "Commissioner of Patents, Washington, D. C."